United States Patent [19]

Podd

[11] 3,996,649
[45] Dec. 14, 1976

[54] HOOK

[76] Inventor: Alexander L. Podd, 306 University Ave., Apt. 21, Fredericton, New Brunswick, Canada

[22] Filed: May 28, 1975

[21] Appl. No.: 581,586

[52] U.S. Cl. .................. 24/230.5 SS; 248/215; 294/85

[51] Int. Cl.² .................. A44B 13/00; E04G 3/00; B66D 3/00

[58] Field of Search .......... 17/44.2, 44.3; 248/215, 248/227, 228, 341; 294/85; 24/230.5 R, 230.5 SS

[56] References Cited
UNITED STATES PATENTS

| 336,671 | 2/1886 | Stevens | 248/215 |
| 493,216 | 3/1893 | Louden | 248/228 UX |
| 607,096 | 7/1898 | Thacher | 248/215 |
| 2,470,878 | 5/1949 | Tate | 248/215 |
| 2,791,461 | 5/1957 | Goldenberg | 294/85 |
| 3,820,195 | 6/1974 | Hutzell | 17/44.2 |

FOREIGN PATENTS OR APPLICATIONS

| 364,373 | 1/1932 | United Kingdom | 248/227 |

Primary Examiner—Donald A. Griffin
Attorney, Agent, or Firm—Stevens, Davis, Miller & Mosher

[57] ABSTRACT

A hook is disclosed for use in containers, refrigerated trucks, packing plants etc. and comprises two separable portions which form a shell for attachment to a container hanger tube. The two portions interlock and hold together by releasable retaining means. A low friction material can be provided in the shell.

5 Claims, 3 Drawing Figures

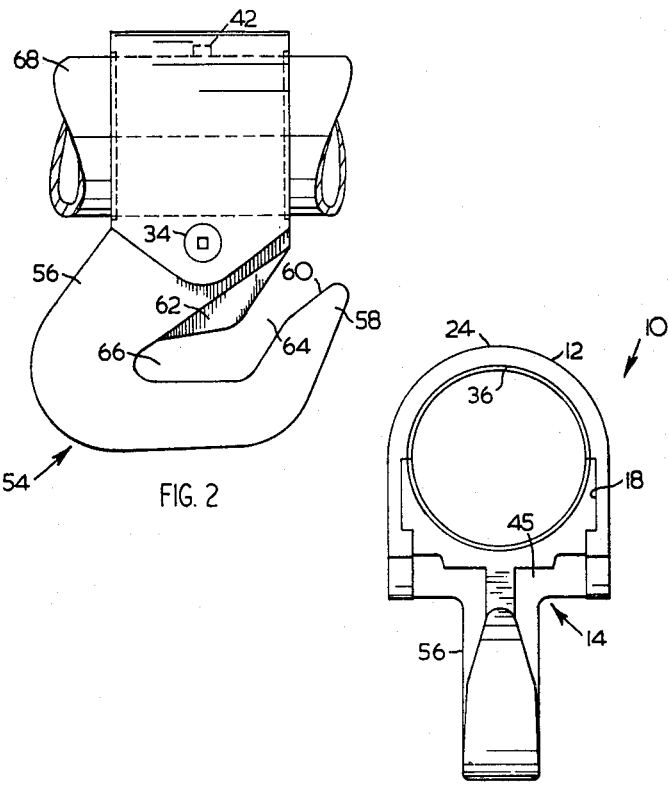

HOOK

This invention relates to a suspension hook of the type used in various forms of containers such as refrigerated vehicles, cold storage houses and the like, specifically for suspending meat in such containers.

Known hooks of this type have several disadvantages; structural weaknesses, too many parts, poor securing means etc. The present invention provides an improvement in this art by disclosing a hook having a minimum number of parts and a construction providing extreme strength.

In accordance with a broad aspect, the invention relates to a two piece hook comprising detachably connected first and second portions adapted when joined to slidably engage a tubular member, said first portion comprising a U-shaped member having a semi-circular base and a pair of legs extending therefrom and a channelled slideway on the inside of each leg and extending transverse thereto; said second portion having a semi-circular base and a pair of shoulders extending therefrom, said shoulders having a mirrored cross section of said slideways in the legs of the upper portion whereby said shoulders snugly fit within said slideways when the first and second portions are joined; means securing said portions together; and a hook integral with and depending from the second section; the semi-circular bases of the portions forming a cylindrical shell when the portions are joined.

The invention is illustrated by way of example in the accompanying drawings wherein:

FIG. 2 is a side elevation of the hook shown in assembled form, and

FIG. 3 is an end elevation of the hook shown in FIG. 2.

Figure 1:
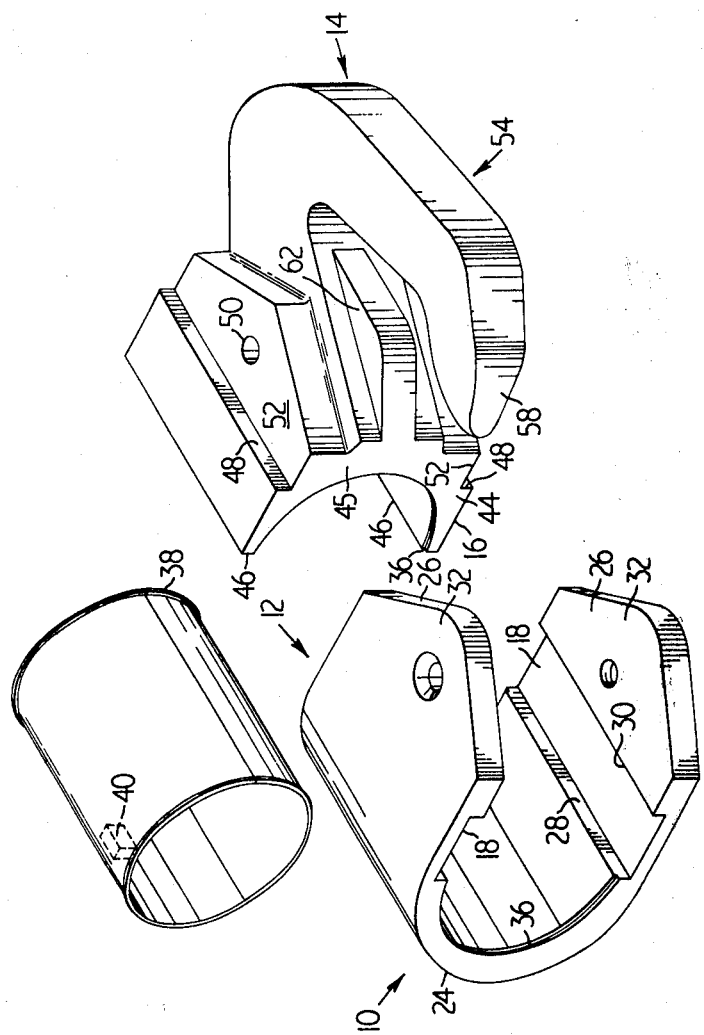
FIG. 1 is a perspective of the invention shown in exploded view.

Referring to FIG. 1, the hook 10 has a first or upper portion 12 and a second or lower portion 14. It will be evident from the drawings that shoulders 16 on the lower portion 14 mate with slideway channels 18 on the upper portion to form a shell around a suspension pipe 20 as shown in FIG. 3. In order to keep friction between the pipe 20 and the hook as low as possible, the inner surfaces of the shell may be coated with a low friction material such as Teflon or a detachable inner shell 22 formed of nylon or the like may be included in the assembly.

The upper portion 12 is U-shaped when viewed in end elevation and includes a semi-circular base 24 and a pair of parallel legs 26 extending therefrom. In parallel with the longitudinal axis of the hook, the slideway channels 18 extend the whole length of the upper portion 12 and each channel has upper and lower sidewalls 28 and 30 respectively. The legs 26 terminate in ears 32 which are drilled to receive a bolt or threaded set screw 34 as shown in FIGS. 2 and 3. If a replaceable bushing or shell 22 is used, the portions 12 and 14 are provided with annular grooves 36 to accommodate a flange 38 on the shell. Alternately, the bushing or shell 22 can be formed with a pin 40 which would fit within a socket 42 formed in the upper portion 12 of the hook as shown in FIG. 2.

The second or lower portion 14 of the hook has a semi-circular or U-shaped base 45, the legs of which are formed by the shoulders 16. Each of the latter has an upper and lower sidewall 46, 48 respectively which snugly fit between the sidewalls 28 and 30 of the upper portion 12 as shown in FIG. 3.

It will be noted that the base 45 is drilled at 50 to receive the set screw or bolt 34, the width of the base between the planar faces 52 being substantially equal to the distance between the inner surface of the ears 32.

The lower end of the lower portion 14 is formed into the finger 54. As shown in FIG. 2, the finger 54 has a broad base 56 which progressively narrows to the tip 58. The inner surface 60 of the tip together with a central rib 62 provide a narrowing passageway 64 which is angularly disposed with respect to the hook area 66.

The preferred use of the hook described herein is for the suspension of meat from tubular hanger bars in containers. In mounting a hook onto such a hanger bar (shown at 68 in FIGS. 2 and 3) the upper portion 12 is placed over the hanger bar with the legs depending therefrom. The lower portion 14 ahead or behind the upper portion and with the inner face of the U-shape base 45 against the bar 68 and oriented so that the shoulders 16 are aligned with the slideways 18. The two portions are then slidably engaged with one another as shown in FIG. 2; and the retaining screw 34 is installed.

It will be observed from FIG. 2 that the sidewalls 48 of the lower portion 14 bear against the sidewalls 30 of the upper portion 12 so that the full weight on the hook finger 54 is distributed to the upper portion 12 through the legs 26 thereof to the base 24.

While the invention has been described in connection with a specific embodiment thereof and in a specific use, various modifications thereof will occur to those skilled in the art without departing from the spirit and scope of the invention as set forth in the appended claims.

The terms and expressions which have been employed is this specification are used as terms of description and not of limitation, and there is no intention in the use of such terms and expressions to exclude any equivalents of the features shown and described or portions thereof, but it is recognized that various modifications are possible within the scope of the invention claimed.

The embodiments of the invention in which an exclusive property or privilege is claimed are defined as follows:

1. A two piece hook comprising detachably connected first and second portions adapted when joined to slidably engage a tubular member; said first portion comprising a U-shaped member having a semi-circular section and a pair of elongated, parallel legs extending chordwise therefrom substantially beyond the semi-circular section and having a channelled slideway on the inside of each leg and extending transverse thereto; said second portion having a base and a pair of shoulders extending therefrom, with a semi-circular surface therebetween, said shoulders having a mirrored cross section of said slideways in the elongated legs of the upper portion whereby said shoulders snugly fit within said slideways when the first and second portions are joined; means for securing said portions together comprising a passageway drilled through the base of the second portion below said shoulders and semicircular surface and being in alignment with apertures in the elongated legs of the first portion when said portions are joined; and an elongated fastening means passing through the passageway and connecting the leg apertures to secure said portions together; and a hook integral with and depending from the base of the second section; the semi-circular sections of the portions forming a cylindrical shell when the portions are joined.

2. A hook according to claim 1 wherein the first and second portions are upper and lower portions respectively.

3. A hook according to claim 1 wherein the slideways in the first portion are rectangular.

4. A hook according to claim 1 including a bushing of low friction material mounted within the shell of the portions.

5. A hook according to claim 4 wherein the portions have annular recesses at either end of their bases and wherein said bushing has a flange at either end adapted to engage the recesses when the portions are joined.

* * * * *